United States Patent [19]
Roeder et al.

[11] Patent Number: 5,086,996
[45] Date of Patent: Feb. 11, 1992

[54] HIGH-CAPACITY FUSELAGE FOR AIRCRAFT

[75] Inventors: Jean Roeder; Leslie J. Geering, both of Cornebarrieu, France

[73] Assignee: Airbus Industrie, Blagnac, France

[21] Appl. No.: 549,970

[22] Filed: Jul. 9, 1990

[30] Foreign Application Priority Data

Jul. 12, 1989 [FR] France ................ 89 09397

[51] Int. Cl.$^5$ ................ B64C 1/00
[52] U.S. Cl. ................ 244/119; 244/118.5; 244/131
[58] Field of Search ........... 244/119, 118.5, 118.6, 244/135 R, 120, 131, 117 R; 98/1.5

[56] References Cited

U.S. PATENT DOCUMENTS

| | | | |
|---|---|---|---|
| 1,859,807 | 5/1932 | Stout | 244/119 |
| 2,147,654 | 2/1939 | Knight | 244/13 |
| 2,162,227 | 6/1939 | Page, Jr. | 244/119 |
| 2,236,482 | 3/1941 | Zindel | 244/119 |
| 3,405,893 | 10/1968 | Flamand et al. | 244/119 |
| 3,425,333 | 2/1969 | Wachter | 98/1.5 |
| 4,674,712 | 6/1987 | Whitener et al. | 244/119 |

FOREIGN PATENT DOCUMENTS 0273466 7/1988 European Pat. Off. .
0676459 6/1939 Fed. Rep. of Germany .
531357 1/1941 United Kingdom ........ 244/119

OTHER PUBLICATIONS

Delft University Press, Martinus Nijhoff Publishers: *Synthesis of Subsonic Airplane Design*, Aug. 4, 1966.

Primary Examiner—Joseph F. Peters, Jr.
Assistant Examiner—Carla Mattix
Attorney, Agent, or Firm—Kenyon & Kenyon

[57] ABSTRACT

A high-capacity aircraft fuselage having two lobes placed side by side and assembled together along two longitudinal lines of junction is designed to facilitate passenger movement from one lobe to the other in accordance with aviation safety regulations. The fuselage includes a top longeron (28) for reinforcing the top line of junction, a floor (23) providing a separation between an upper internal space which can serve as a cabin (24) and a lower internal space (25) which can serve as a hold, a girder (32) for supporting the cabin floor and connecting it to the bottom portion of the fuselage, rows of seats extending from one side of the bilobed body to the other, a bottom longeron (29) for reinforcement along the bottom line of intersection, and posts (31) disposed in spaced relation in the rows of seats for connecting the top longeron (28) to structural members located in the lower region of the fuselage (32, 29).

27 Claims, 12 Drawing Sheets

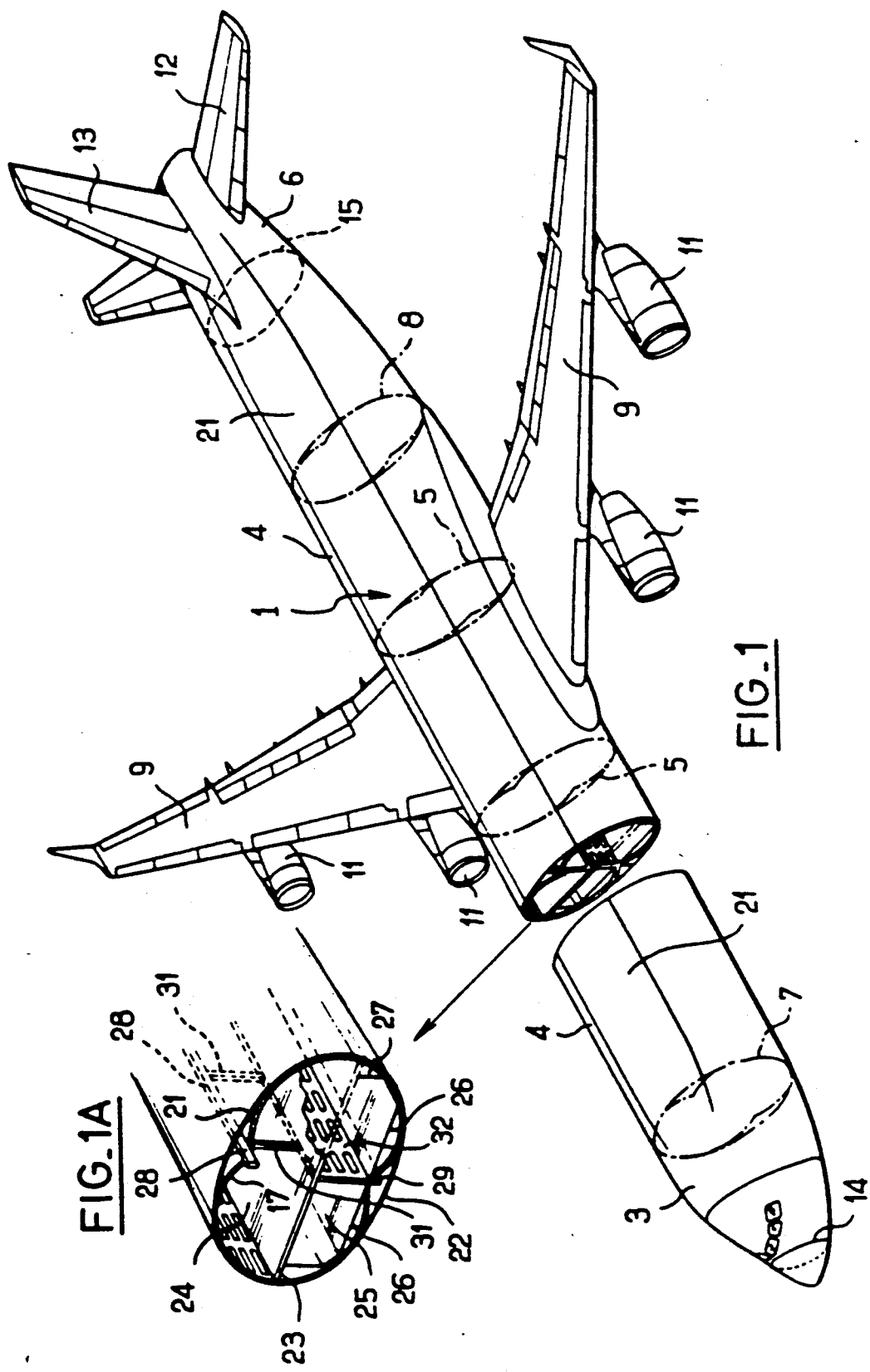

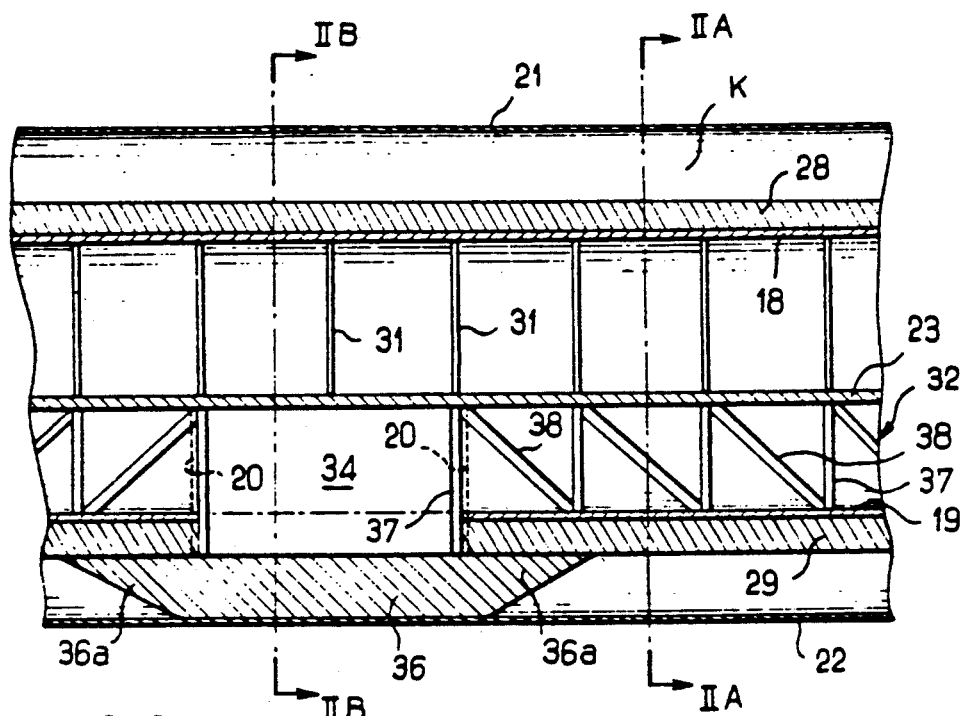
FIG_3
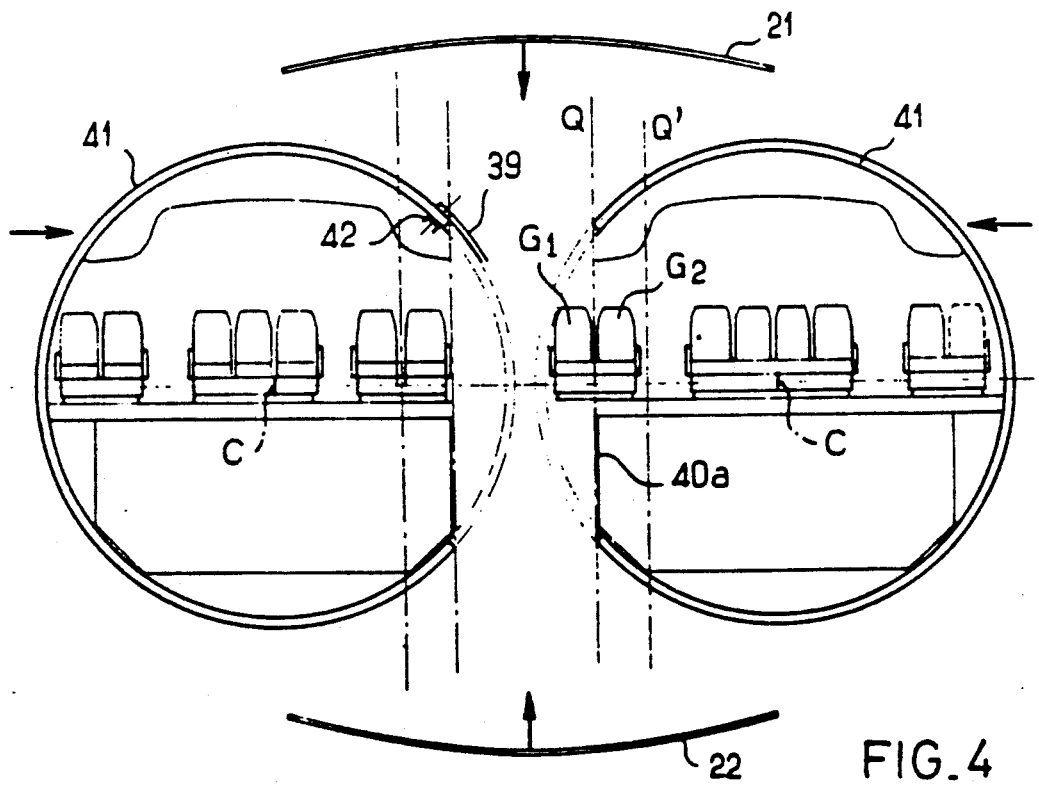
FIG_4

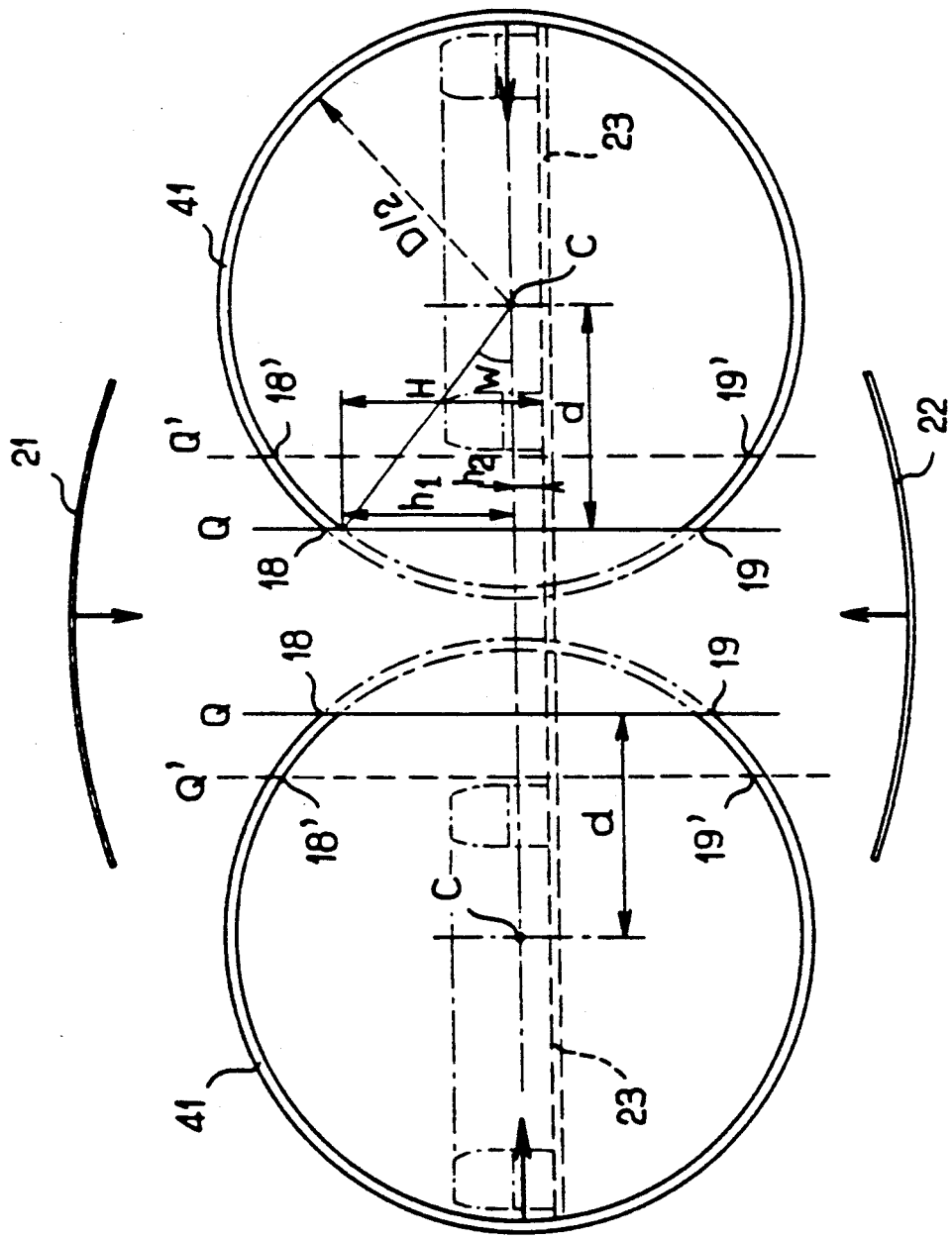
FIG_4A

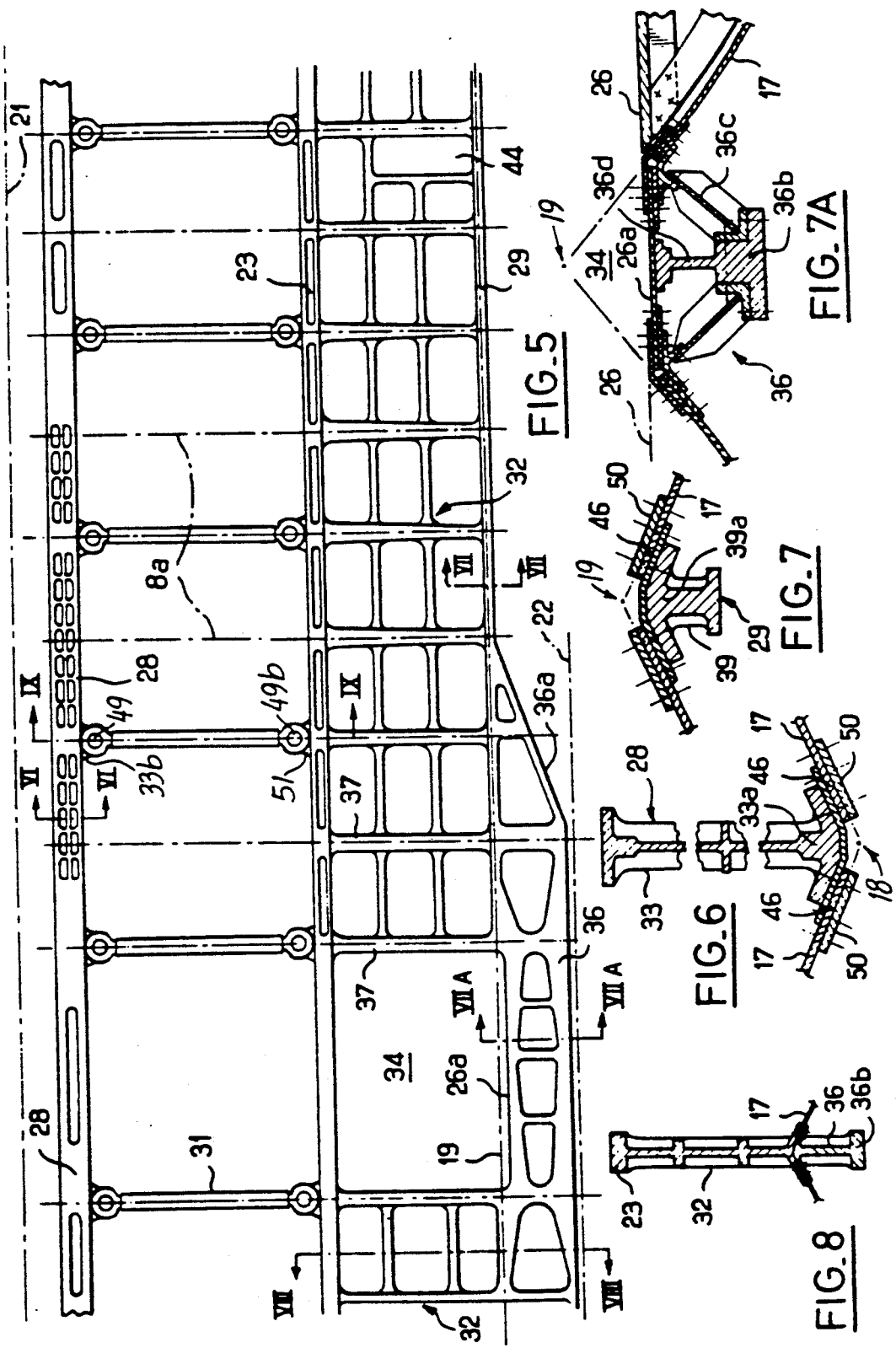

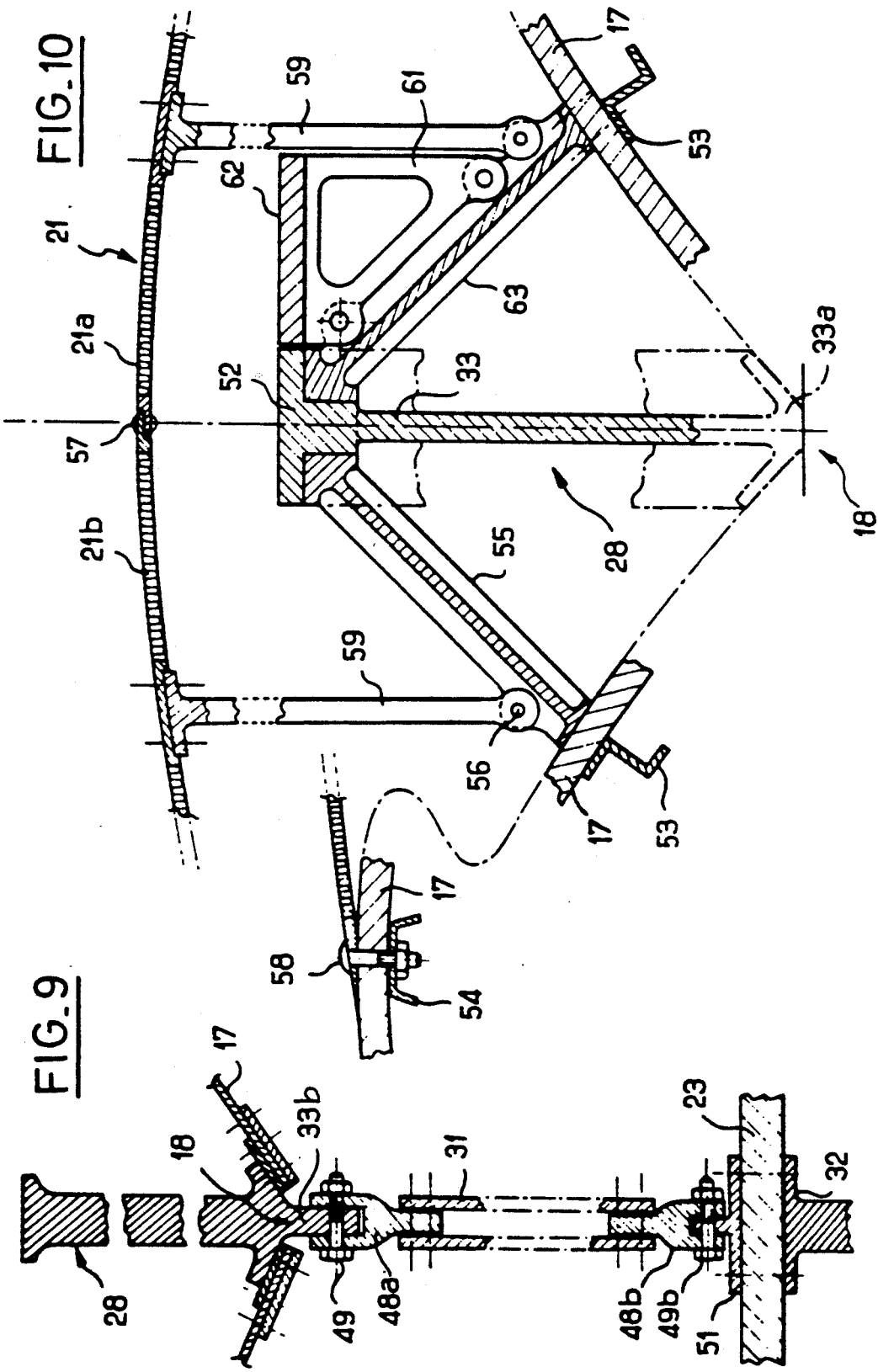

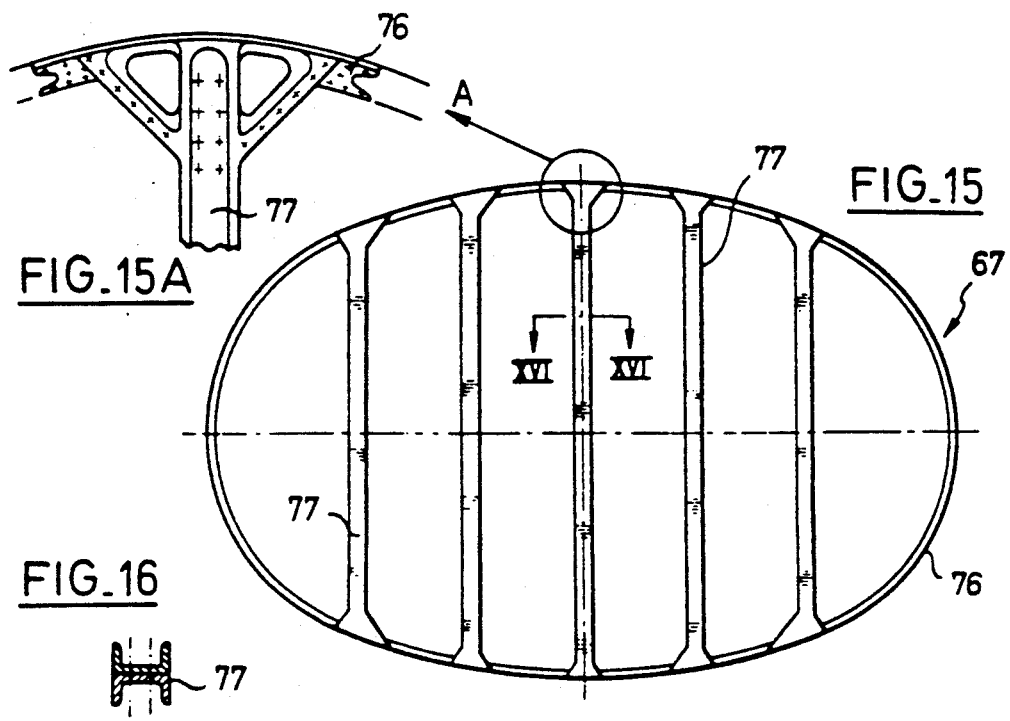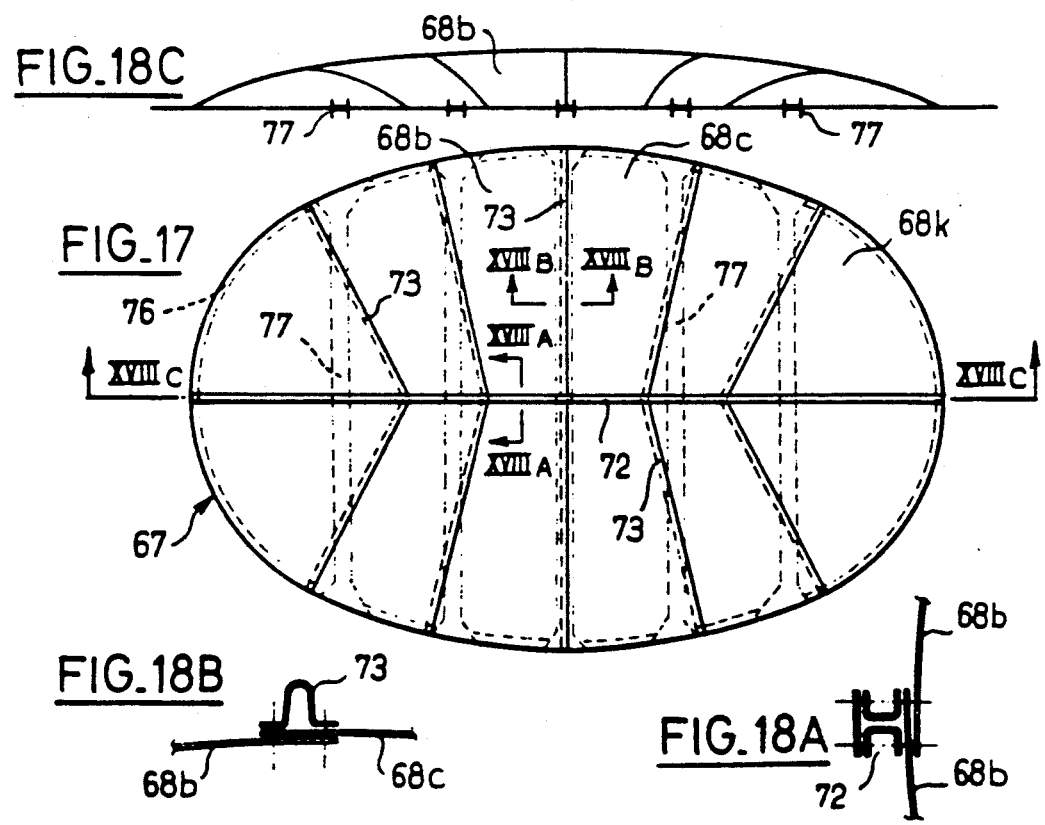

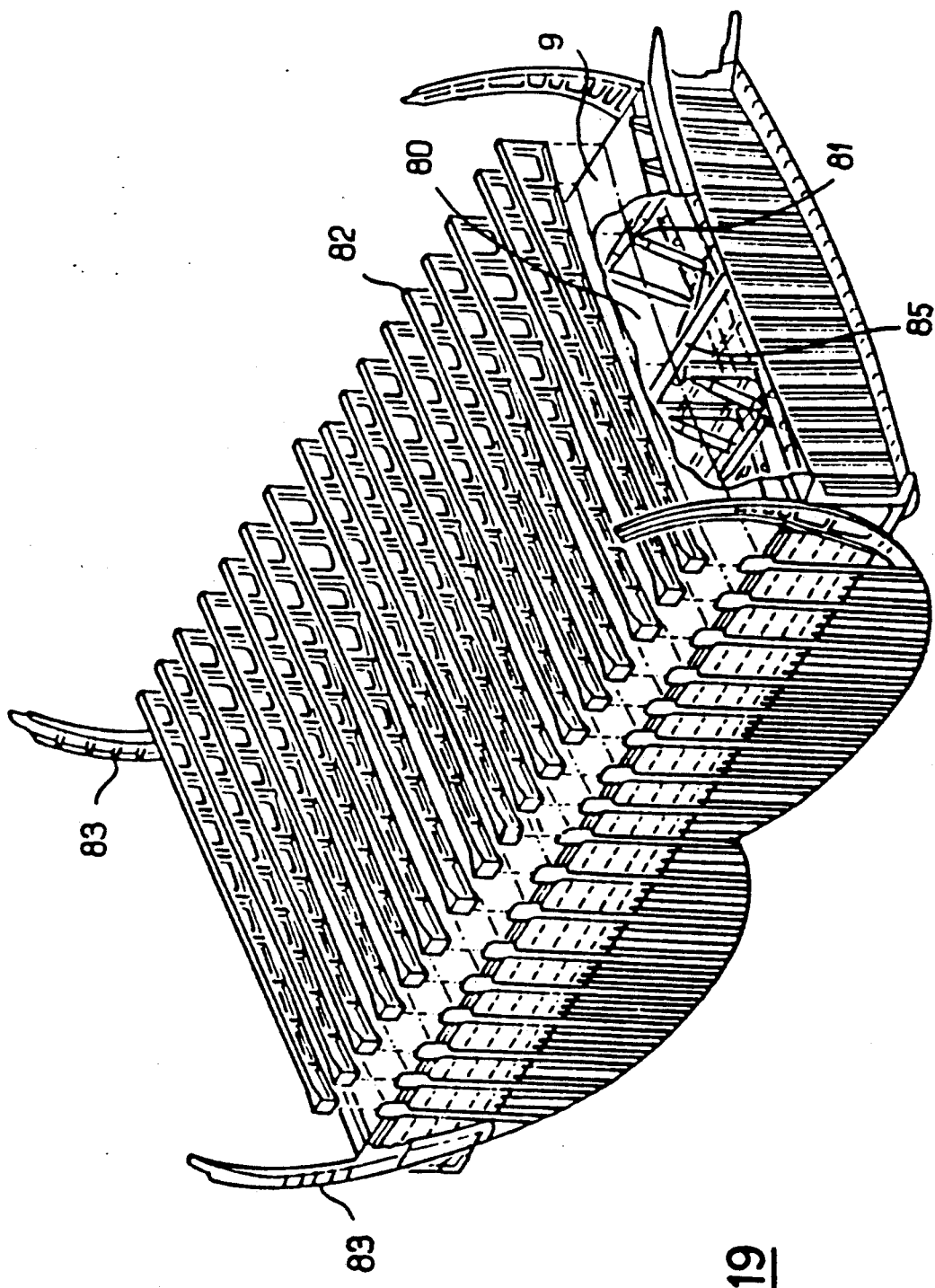
FIG._19

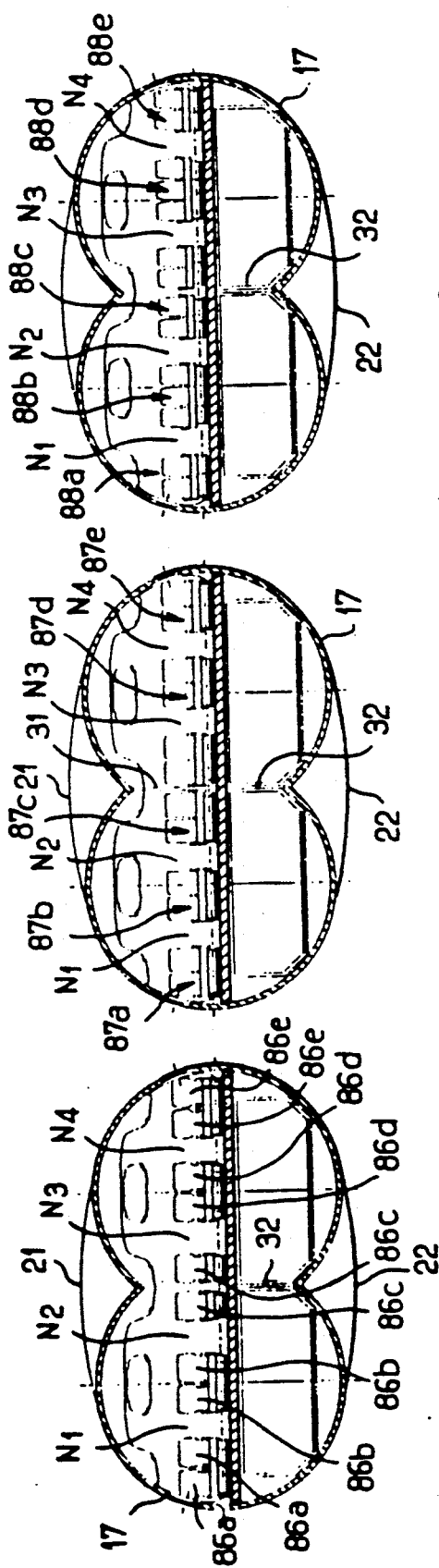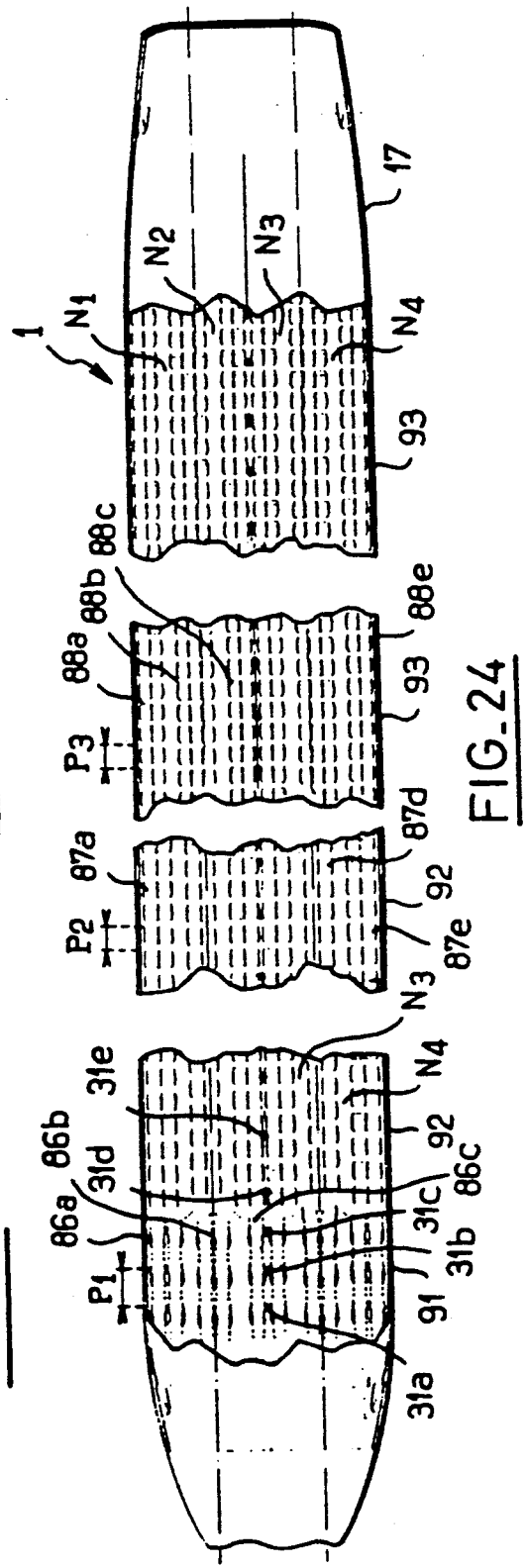

HIGH-CAPACITY FUSELAGE FOR AIRCRAFT

BACKGROUND OF THE INVENTION

1. Field of the Invention

The present invention relates to a bilobed fuselage for an aircraft which is intended to be employed for carrying passengers or freight, or both. The invention is more particularly concerned with a bilobed fuselage for a high-capacity transport aircraft.

The invention is also directed to aircraft equipped with a fuselage of this type.

2. Description of the Prior Art

Generally speaking, the design of an aircraft fuselage has to satisfy a large number of criteria. These give rise to compromises between requirements of a functional character and requirements of a structural character so as to result in acceptable weight and minimum production cost. It is readily apparent that this design must also be adapted to aeronautical certification requirements and to market requirements.

An aircraft fuselage normally has the function of carrying a payload in the form of passengers and baggage as well as freight. In regard to the cabin, this implies flexibility in the arrangement of seats and service locations (galleys, toilets, and so on) as well as suitable means for access and evacuation. The compartments provided for freight are usually loaded by passing into the fuselage on only one side. This makes it possible to reduce stopover times since access to passengers is provided on the other side of the fuselage.

In order to build structures of acceptable weight, it is necessary to take into account the pressurization of the cabin, which ensures a comfortable atmosphere during high-altitude flight as well as the total load constituted by the resultant of the forces generated by the flight mission of the aircraft under given atmospheric conditions. For the greater part of the fuselage, the pressure within the interior of the cabin is the predominant load to be taken into account for dimensioning. In this connection, the optimum structure is constituted by a segment of cylindrical fuselage having a substantially circular or practically circular cross section. The difference in pressure prevailing on each side of the shell results in peripheral stress which is counterbalanced by longitudinal members as well as by transverse structures known as frames, and pressure-resistant partition walls or bulkheads.

Production costs may be substantially reduced by making use of parts which already exist in other types of aircraft. Similarly, it is an advantage to develop aircraft having identical subassemblies or subassemblies comprising many common parts since initial production tooling costs may accordingly be amortised over a larger series. Furthermore, it may prove justified to make fuller use of automation owing to the additional reduction in costs which is thus made possible.

In the field of aeronautics, market requirements tend to impose an increase in the number of passengers which can be carried by a single aircraft while at the same time maintaining acceptable external dimensions of the aircraft. The object of this tendency is to limit the congestion of airports and air traffic by reducing the number of flights. A further object is to obtain a direct operating cost (DOC) per passenger which is as low as possible. As a general rule, the cost just mentioned includes a percentage of the initial purchase price, the cost of fuel, costs of operating personnel (crew) and of maintenance. Under these conditions, if additional seats are installed at limited cost, this may appreciably reduce the direct operating cost per seat. Similarly, a large baggage-hold volume which can effectively be employed for freight or other purposes may significantly reduce operating costs owing to the possibilities of additional income which are thus offered.

In order to increase the usable volume of the fuselage without excessively increasing the external dimensions of the aircraft, different cross sections have been studied. Vertical bilobed fuselages or in other words fuselages having two longitudinal lobes placed one above the other and juxtaposed in a horizontal plane have already been built and put into service.

While being relatively compact, this form of construction is nevertheless subject to disadvantages in regard to volume utilization of the fuselage and complicates passenger access to the upper deck, taking into account existing airport facilities. This entails the need to install interior stairways, thus reducing available space as well as the structural efficiency of the aircraft.

It has also been proposed to construct an airplane having a fuselage which is bilobed in the lateral or horizontal direction or in other words which has two longitudinal lobes juxtaposed substantially in a longitudinal vertical plane. This is the case in particular of U.S. Pat. No. 3,405,893 (C. Flamand et al) and U.S. Pat. No. 4,674,712 (Whitener) which describe a bilobed-fuselage airplane, each lobe being limited by a flat longitudinal wall along its intersection with the other lobe. This dividing wall, which is thus vertical in the trim position of the airplane, constitutes a common vertical joint plane. Moreover, the two lobes are surrounded by an air-tight outer shell of oval cross-section which is formed of high-strength metal. In the upper portion reserved for passengers, a few openings of limited number are provided for passing from one lobe to the other.

This bilobed-fuselage airplane constitutes a rather small improvement over conventional aircraft for the following reasons:

the presence of an oval shell of high-strength metal and of a central wall over the greater part of the length of the aircraft result in a weight estimate which is not improved or which is improved only to a very slight extent;

the central wall, which is almost continuous, increases the weight of the aircraft and constitutes a considerable obstacle to the movement of passengers from one side of the aircraft to the other. This is a very serious disadvantage from the point of view of passenger safety in the event of incident or of accident. As a further consequence, service on board the aircraft is also unfavorably affected and the same applies to freight loading conditions since in this case both sides of the fuselage have to be employed in practice for passenger access.

The present invention relates to a different design of aircraft fuselage, the greater part of which has a body which is bilobed in the lateral direction. The object of the invention is in fact to construct a fuselage by means of existing components, the increase in weight of this fuselage being relatively small with respect to the increase in the number of seats of the upper deck and/or with respect to the increase in freight as well as increased flexibility in the distribution of seats.

The invention is also directed to a high-capacity aircraft in which the movement of persons from one side of the aircraft to the other is greatly facilitated in order to comply with aviation safety regulations and to permit entry of passengers through only one side of the fuselage.

SUMMARY OF THE INVENTION

The present invention is thus concerned with an aircraft fuselage, the greater part of said fuselage being constituted by a shell which is bilobed in the lateral direction or in other words which has two lobes placed side by side so as to form two longitudinal lines of junction consisting respectively of a top line and a bottom line, and said fuselage essentially comprises:

a top longeron means for stiffening along said top line of junction;

a floor forming a separation between an upper internal space which may serve as a cabin and a lower multiple-purpose internal space for use in particular as a freight hold;

means for supporting the cabin floor which are arranged between this latter and the lower portion of said fuselage;

rows of seats which are arranged within the cabin space and can extend substantially from one side of the bilobed shell to the other;

a bottom longeron means for stiffening along said bottom line of junction;

spaced connecting means disposed at intervals in said rows of seats for connecting the top longeron means to the substructure means of the fuselage.

The longeron means above referred to, which designates either a single member or an assembly of several members, is hereinafter in the present specification and claims called longeron for the sake of conciseness.

The arrangement of the longerons along the lines of junction of the two lobes endows the fuselage with the necessary resistance to internal pressure and to dynamic stresses which makes it possible to dispense with the central wall at least in the greater part of the upper internal space and to replace it by a succession of connecting posts which almost entirely free the bilobed internal space and offer complete freedom of passenger movement within the double cabin in the transverse direction.

In a preferred embodiment of the invention, the cross-section of the bilobed body comprises two secant curves each having a substantially circular contour having the same radius. The distance between centers of the two juxtaposed lobes can vary within appreciable limits, the lift being better as these centers are spaced at a greater distance from each other. However, the limit of spacing is given by the need to maintain a practicable passageway between the two lobes while also taking into account the height of the cabin floor with respect to the plane of the axes of the lobes. Under these conditions, it is an advantage to ensure that the width of a cross-section of the bilobed body is substantially within the range of 1.5 to 1.8 D, where D designates the diameter of each lobe.

In a preferred embodiment of the invention, the fuselage comprises over at least part of its length:

a top stiffening longeron placed above the top line of junction of the bilobed shell;

a series of spaced posts which are disposed at intervals in the longitudinal mid-plane and connect the aforementioned longeron to the cabin floor;

a girder which supports said cabin floor and connects it to the bottom stiffening longeron in the vicinity of the bottom line of junction of the two shell lobes.

In another embodiment which permits free transverse movement for freight beneath the cabin floor, the bottom stiffening longeron is entirely placed beneath the bottom line of junction of the shell and beneath the baggage-hold floor, at least opposite to an opening for loading containers, and the spaced connection means such as posts are placed between the top longeron and the bottom longeron with intermediate attachment to the cabin floor.

The two foregoing embodiments can also be associated with each other over the length of the fuselage.

Preferably, the top and bottom lines of junction of the shell are covered by an added fairing panel which is not subjected to pressurization and achieves enhanced aerodynamic characteristics of the aircraft.

As will hereinafter become apparent, the fuselage structure contemplated by the invention offers considerable flexibility of arrangement according to requirements and limits production costs while offering great ease of utilization.

BRIEF DESCRIPTION OF THE DRAWINGS

FIG. 1 is a general view in perspective with a transverse cross-section and showing one example of an aircraft having a fuselage in accordance with the invention, in which the upper deck is intended for passengers and the lower deck is intended for freight.

FIG. 1A is an enlarged view of the cross-section of FIG. 1 with a portion of the floor which has been broken away.

FIG. 3 is a schematic fragmentary longitudinal sectional view along line III—III of FIG. 2B showing one mode of construction of a central longitudinal girder located between the cabin floor and the bottom stiffening longeron.

FIG. 4 is a schematic sectional view which shows how to construct a bilobed fuselage from two identical fuselages.

FIG. 4A is a simplified explanatory diagram based on FIG. 4.

FIG. 5 is a fragmentary longitudinal sectional view which is similar to FIG. 3, showing a particular detailed structural design of the frameworks of the bilobed type of FIG. 1, especially in the region of the opening which is provided in the hold and through which containers can be passed.

FIGS. 6, 7, 7A, 8 and 9 are cross-sections to a larger scale (except for FIG. 8), respectively along the planes VI—VI, VII—VII, VIIA—VIIA, VIII—VIII and IX—IX of FIG. 5.

FIG. 10 shows to a still larger scale a cross-section of the top longeron in the zone in which a service walkway is located.

FIG. 15 is a view in elevation showing one embodiment of a pressurization bulkhead.

FIG. 15A is an enlarged view of the detail A of FIG. 15.

FIG. 16 is a schematic view in cross-section along line XVI—XVI of the bulkhead of FIG. 15.

FIG. 17 is a view of the bulkhead aforesaid on the side opposite to that of FIG. 15 and showing the different panels which constitute said bulkhead.

FIGS. 18 A, B, C are fragmentary sectional views taken along lines XVIII—XVIII A, B and C respectively of FIG. 17.

FIG. 19 is a view in perspective with portions broken away and showing that portion of the wing unit which is located within the fuselage of FIG. 1.

FIGS. 21, 22 and 23 are schematic views of three possible seating arrangements.

FIG. 24 is a schematic fragmentary plan view of a bilobed fuselage in accordance with the invention in which several seating arrangements are provided at the same time.

DETAILED DESCRIPTION OF THE INVENTION

Figure 2A:
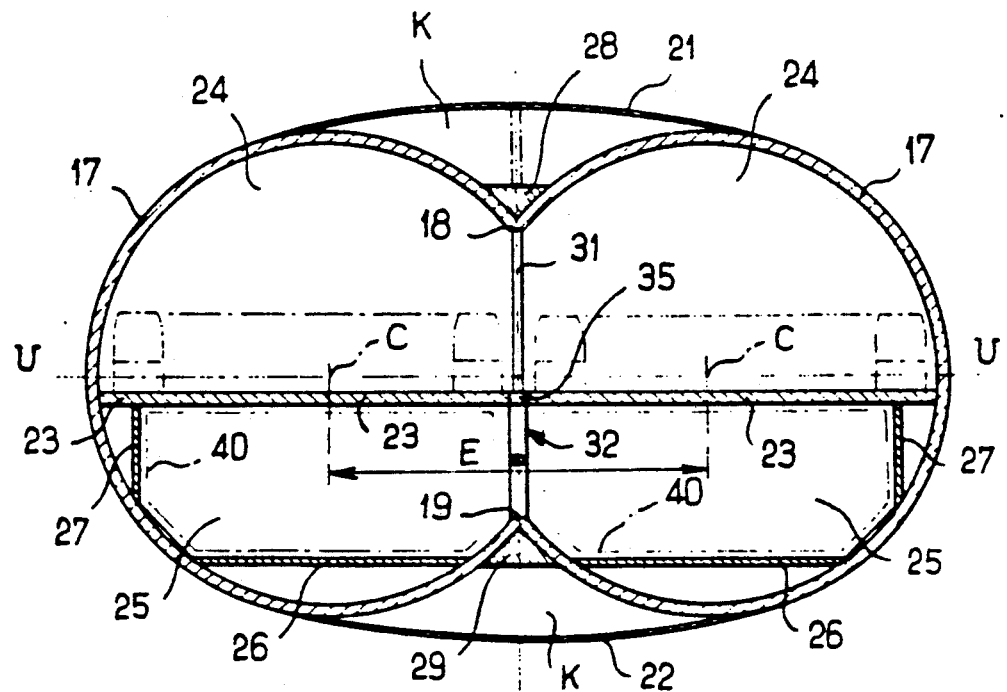
FIGS. 2A and 2B are transverse sectional views of a schematic design of the fuselage, these cross-sections being taken along lines IIA—IIA and IIB—IIB of FIG. 3.

Reference being made to FIGS. 1 and 1A of the accompanying drawings, there is shown a high-capacity aircraft provided with a bilobed fuselage 1 in accordance with the invention. Considered from front to rear, the fuselage consists of the nose 3, the central bilobed section 4 and a tail 6, these three portions being joined to each other at the level of transverse reinforcements or ring frames, namely a frame 7 at the forward end and a frame 8 at the rear. Other intermediate ring frames are shown diagrammatically at 5.

The nose 3 includes in particular the cockpit enclosure and the aircraft control systems. The central section 4 carries a wing unit 9 which in turn supports propulsion engines 11.

The tail 6 carries in particular a horizontal tailplane 12 and a vertical tailplane 13.

The habitable portion of the fuselage is limited by a forward pressurization bulkhead 14 and an aft pressurization bulkhead 15 for ensuring the comfort of passengers during high-altitude flight.

In the cross-section of FIG. 1A taken in the central section 4 which has been rotated to a slight extent with respect to FIG. 1 in order to show the internal arrangement of the bilobed fuselage 1 more clearly, there are shown the main structural elements constituting said fuselage.

Figure 2B:
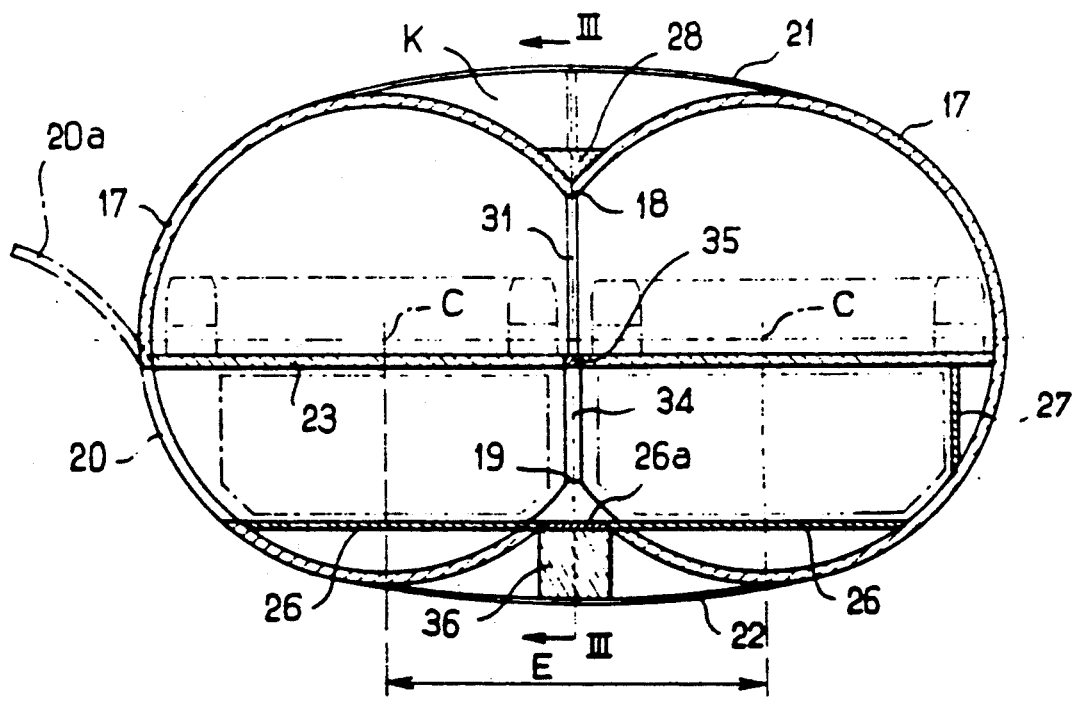
Figure 11:
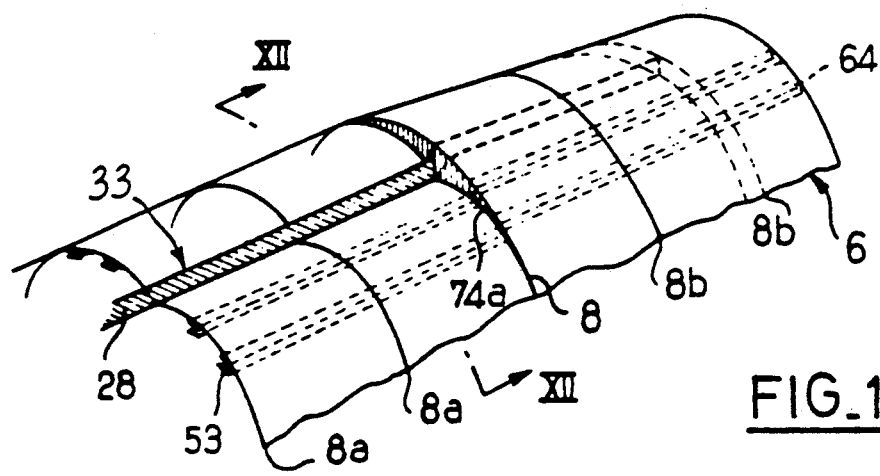
FIG. 11 is a schematic view in perspective showing the longitudinal transition between the bilobed body and the rear portion of the fuselage of FIG. 1.

In particular, the section 4 comprises a bilobed shell 17 constituted by the junction of two lobes formed by two similar fuselage shell elements having substantially circular cross-sections which are placed side by side and meet each other along a longitudinal mid-plane of the aircraft along two lines of junction, namely a top junction line 18 and a bottom junction line 19 (see also FIGS. 2A, 2B and 3). In a preferred embodiment of the invention, these lines are covered by added fairings, namely a top fairing 21 and a bottom fairing 22, which are intended to improve the aerodynamic properties of the aircraft and to permit uniform flow of the airstream.

The bilobed fuselage is divided into two superposed internal spaces by a first floor 23 located in the vicinity of the horizontal mid-plane U—U which joins the axes C—C of the two lobes of the shell 17 (FIG. 2A). In the example of the figures mentioned above, the floor 23 is located beneath the plane U—U. The floor 23 forms a partition between the upper internal space 24 which forms a passenger cabin and a lower internal space 25 which serves as a hold for baggage and freight.

The internal space 25 is limited at the bottom by a second floor 26 and laterally by walls 27 so as to correspond to the dimensions of the containers 40 which are standardized in the aircraft industry.

The internal spaces 24 and 25 will hereafter be respectively designated as the cabin and the hold, the floor 23 being the cabin floor and the floor 26 being the hold floor.

The cabin floor 23 is shown as partly broken away in FIG. 1A in order to show the median longitudinal structure of the bilobed fuselage more clearly. This structure comprises two stiffening longerons 28 and 29, namely a top and bottom longeron respectively, which are disposed along the top and bottom lines of junction of the two lobes of the shell 17.

The longerons 28 and 29 are connected by means of a plurality of associated structural members which are capable of working in both compression and tension. Said members are disposed in the vertical mid-plane of the fuselage and include a succession of spaced posts 31 which extend over the entire length of the fuselage section 4 between the top longeron 28 and the floor 23. In addition, there is mounted between said floor 23 and the bottom longeron 29 an open-web girder 32 which supports the floor 23 in the longitudinal mid-plane of the aircraft.

The girder 32 extends over the greater part of the fuselage section 4 but not over its entire length, as will be seen hereinafter.

The structural members aforesaid (17, 28, 29, 31 and 32) may be constructed in accordance with many different designs which make use of current technologies in the aircraft industry. For this reason, the structures are not shown in detail in FIGS. 2A, 2B and 3.

Thus the shell 17 can be constituted by a conventional structure formed by a longitudinal assembly of annular sections or ring frames in a honeycomb arrangement, a continuous metallic wall or skin surrounding these latter. The assembly conforms to the structure of a monolobe-fuselage aircraft but is cut at the level of the lines of intersection 18 and 19 provided for the junction of one lobe with the adjacent lobe.

The longerons 28 and 29 are provided for joining together the edges of the two lobes.

The connecting girder 32 between the floor 23 and the longeron 29 can be separate from said longeron and can be either attached to this latter or integral therewith. Said girder can in particular be constituted by an open-web beam as shown in FIG. 3 and having a series of upright members 37, which are preferably (but not necessarily) located in the line of extension of the posts 31, and of diagonal bracing members 38.

The girder 32 can also be constituted differently, for example by means of a lattice beam as will be seen hereafter.

In all cases, the associated structural members 17, 28, 29, 31 and 32 of the double bilobed fuselage are so designed as to be capable of affording resistance to all the static and dynamic stresses to which this fuselage may be subjected in the various possible situations: on the ground, at take-off, on landing and in flight, especially at high altitude. It is in the high-altitude situation that the highest stresses are exerted by reason of the pressurization of the cabin and tend to burst the fuselage. The other stresses arise in particular from the load transported and from the weight of the structures themselves.

The invention overcomes a prejudice by making it possible in a bilobed fuselage to compensate the stresses existing along the line of junction of the two lobes, at a discrete number of points corresponding to the posts 31. This results in great ease of movement of passengers from one side of the fuselage to the other.

Determination of the structural members which connect the lines of junction 18 and 19 of the two lobes of the bilobed shell is carried out as a function of the considerations which now follow.

Figure 29:
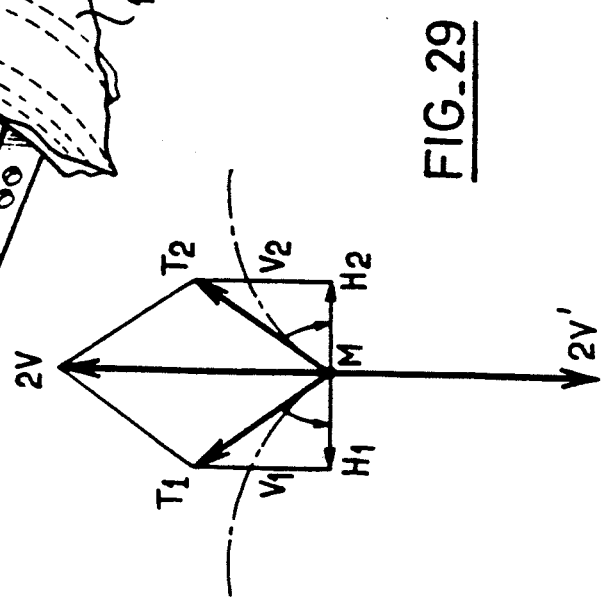
FIG. 29 is a simplified diagram of the forces exerted on the top longeron.

In regard to stresses related to pressurization of the cabin, FIG. 29 gives a simplified diagram of the forces exerted in a transverse plane, at the upper line of junction M of two lobes of substantially circular cross-section. The resultant forces are two tangential forces T1, T2 which can be resolved on the one hand into two equal and opposite horizontal components H1, H2 which cancel each other and on the other hand into two equal and upward vertical components V1, V2 which are added to produce an upward resultant 2 V, and which must therefore be compensated by an equal downward force 2 V'.

In order to achieve this object, the aforementioned structural members constituted by the top longeron 28, the bottom longeron 29 and the interconnection means have to perform different functions.

The primary function of the top longeron 28 is to compensate, at each point of the top line of junction, the forces (V1+V2=2 V) which are represented schematically in FIG. 29 and generated by the pressurization. The compensating force 2 V' is transmitted mainly by the posts 31 which work in tension. Since these posts are relatively distant from each other, the top longeron 28 also has the function of distributing the compensation effort along the top line of junction. Moreover, the top longeron plays a contributory role in supporting the top fairing 21 as well as a service walkway (not shown) which may be provided and to which further reference will be made hereafter.

In the region of the bottom line of junction 19 of the two lobes of the bilobed body 17, compensation of overpressure forces is carried out in a similar manner by means of the girder 32 and the bottom longeron 29. The girder 32 is rigidly fixed to the floor 23 and supports this latter. The floor 23, which includes a central longitudinal beam 35, is in turn attached to the posts 31. In order to carry out this compensation, the girder 32 works in tension.

In accordance with another particular feature of the invention, provision is made to adapt the girder 32 and the bottom longeron 29 so as to permit the containers which have been loaded into the hold 25 through a hatchway or lateral opening 20, closed by hatch or a door 20a (shown in FIG. 2B) to be passed through the girder 32. To this end, as shown in FIGS. 2B and 3, the bottom longeron 29 is interrupted in the region of the girder 32 opposite to the opening 34 through which the containers are passed from one lobe into the other. The hold floor plates 26 are joined to each other opposite to this opening by means of a horizontal-plane element 26a. To this end, the inner portions of the two segments of the bilobed body 17 which are close to the bottom line of junction 19 are eliminated together with a portion of the bottom longeron 29, as shown in the cross-section of FIG. 2B. Corresponding stresses are transmitted to a longeron element 36 forming a keel and connected in a bevel-joint at both ends 36a to the longeron 29 (as shown in FIG. 3).

The assembly of longerons 29 and 36 thus formed ensures continuity in the transmission of forces in spite of the discontinuity produced by the opening 34.

According to another aspect of the invention, provision is made to adapt the spacing E of the centers C of the two circular-section fuselages, the junction of which constitutes the bilobed shell 17, in accordance with a number of different criteria which can be selectively favored by the builder according to the specification conditions to be satisfied.

More particularly, the diagrams of FIGS. 4 and 4A show how a bilobed fuselage shell in accordance with the invention can be formed from two cylindrical fuselage shells 41 having the same diameter D. To this end, each fuselage is cut at its intersection with a plane Q parallel to its axis, the distance d from the axis to the plane Q being the same in both cases. The next step consists in assembling the two lobes along their top and bottom lines of junction 18 and 19.

The relatively displaced lines 18', 19' (planes Q') indicate the possible margins of variation of d for adaptation to the different uses which are contemplated, by giving preference to certain structural parameters.

In particular, the following choices can be made as a function especially of the diameter D of each lobe:

The cut-out portion should eliminate only one (G1−plane Q) or two (G1+G2−plane Q') seats from a row without creating any waste of space.

It should be ensured that the cut-out portion corresponds to the standardized external dimensions of a container 40 or in other words that the vertical wall 40a of such a container is located in the plane Q (FIG. 4) with allowance for the necessary clearances.

With the object of using existing monolobe-aircraft shell structures, it should be ensured that the plane Q corresponds to the stringer 42 to which the return of the outer sheet 39 of a monolobe-aircraft shell is normally joined (as shown in FIG. 4).

The possibility of employing partial structures of pre-existing cylindrical shells constitutes an essential advantage of the invention since this avoids the need to undertake a very large number of studies and to design new tool components.

The spacing E of the centers C, which is equal to 2d, also partly governs the headroom H or height of passage from one lobe to the other within the cabin 24, together with the position of the floor 23 with respect to the plane C—C. This height H is equal to (h1+h2), where h1 designates ½ D sin W, where W designates the angle at the center of the opening provided in the shell and h2 designates the height of the floor 23 with respect to the plane C—C.

In order to make the most profitable use of the invention, it is in fact necessary to ensure that H is at least equal to an average height of a man, namely between 1.80 and 2 m, h2 being usually different from zero.

Moreover, in the case of a large transport aircraft, the diameter D of each cylindrical fuselage 41 can advantageously be chosen between 5 m and 6 m.

Taking into account the value of the parameters given above, it is an advantage to increase the spacing E of the axes C of the two lobes in order to improve the lift of the fuselage.

Preferably, the total transverse dimension of a bilobed body will be chosen within the range of 1.5 to 1.8 D. For example, if D=5.5 m, the bilobed body will preferably have a total transverse dimension within the range of 8.25 m to 9.9 m.

Once the two lobes have been assembled together, the fairings 21 and 22 are placed in position by fixing them on the shell of the bilobed fuselage, as will be explained hereinafter. The enclosure K (FIGS. 2A, 2B) formed between the shell 17 and the fairing 21 or 22 is not pressurized but only constitutes a confined space.

FIGS. 5 to 10 show in greater detail the structure of the fuselage in accordance with the invention in the plane of symmetry, in which the two shells 41 are joined together so as to form the bilobed fuselage 17.

The top longeron 28 covered by the fairing shown diagrammatically at 21 is mainly constituted by a ribbed beam 33 (FIG. 6) which forms a V-section shoe 33a at the lower end. By means of reinforcing gussets 50, the ends 46 of the walls of each lobe are fixed on the flanges of said shoe by any means customarily employed in the aircraft industry (riveting, bolting, and so on).

The structure of the longerons 28 and 29 varies as a function of the structural modifications made in the girder 32 which is constituted in this case by a lattice girder but has various discontinuities which facilitate handling operations within the hold 25. In particular, provision is made opposite to the hold lateral opening 20 for a large opening 34 through which containers can be passed from one lobe into the other and for an opening 44 through which members of service staff can pass.

The top longeron 28 is reinforced directly above these openings.

As shown in FIG. 7, the bottom longeron 29, which is placed beneath the junction line 19 of the lobes, is a ribbed beam 39 with an inverted V-section top shoe 39a.

FIG. 7A shows how a continuity of level between the two lower floor plates 26 (only one of which is shown) for the transfer of freight from one lobe into the other is achieved in the region of the container opening 34. There is shown in particular the triangulated-section structure of the dropped longeron member 36 provided with a keel 36b and two wings 36c which both serve to attach the central panels of the shell 17. The web 36d of the dropped longeron member 36 supports the plane element 26a which is located beneath the line of junction 19, thus ensuring continuity of the hold floors 26.

The longeron member 36, which extends substantially beyond the opening 34, has the shape of an isosceles trapezoid, and its triangular ends 36a are connected to the bottom longeron 29 in a bevel joint. The connection is made so as to avoid any discontinuity or node in the distribution of stresses.

FIG. 8 shows that girder 32 is a ribbed beam having a top flange that is integral with floor 23 and having an inverted V-section bottom flange, with the lobe shells 17 being clamped between the bottom flange of the girder 32 and the top shoe of the dropped bottom longeron member 36.

In addition, FIG. 5 shows diagrammatically in chain-dotted lines the locations of the ends 8a of the ring frames of bilobed shape, said frames being assembled in a series which constitutes the shell 17. The ends of said frames have a pitch equal to that of the upright members 37.

FIG. 9 shows how the top longeron 28 may be connected to a tubular post 31 by means of a clevis 48a which clamps a lug or padeye 33b depending from said longeron and is secured to this padeye by means of a bolt 49. The clevis 48a is in turn connected to the upper end of the post 31 by means of bolts (not shown). At the lower end, the post 31 is also attached to the cabin floor 23 by means of a second clevis 48b which is engaged on a T-plate 51 and secured by means of a bolt 49b. The plate 51 is rigidly fixed to the floor 23 by means of bolts (not shown) which are attached to the top portion of the girder 32. It is apparent that a continuous connection is thus ensured with distribution of stresses between the longerons 28 and 29.

FIG. 10 shows how the top longeron 28, the fuselage shell 17 and the top fairing 21 can be assembled together.

In this example, there is provided for the shell 17, apart from its connection with the shoe 33a of the ribbed beam 33 (see FIGS. 6 and 10), an additional triangulated connection between a T-shaped top seating 52 of the ribbed beam 33 and that portion of the shell 17 which is close to a longitudinal member or stringer 53. To this end, provision is made for struts 55, 63 which are mounted obliquely and applied at one end against the seating 52 of the longeron 28 and at the other end against the shell 17 and the stringer 53. Attachment of the strut 55 is carried out by means of bolts (not shown).

The fairing 21 is preferably constituted by a series of cambered panels 21a, 21b assembled together by means of rivets 57 in the vertical plane of symmetry of the aircraft.

The fairing 21 is joined tangentially to each lobe of the shell 17, along a stringer 54, by means of bolts 58. Furthermore, the fairing 21 is supported by upright members 59 and connected thereto by means of attachments which are not shown in the drawings. Each upright member 59 is in turn attached at its lower end 56 to a strut 55 or 63.

Triangular-section supports 61 can be fixed on the struts 55 or 63, said supports 61 being each provided with a platform element 62 in the line of extension of the seating 52 of the longeron 28. The support surface thus constituted can be employed in various ways and possibly in order to provide the necessary bearing points for the installation of a service walkway.

FIGS. 11 to 14 show diagrammatically and by way of example how it is possible to adapt the structure of the top longeron 28 and the related structures in the aft transition zone close to the tail 6 (see FIG. 1) in which the dimensions of the fuselage decrease and in which a bilobed fuselage structure changes to a monolobe structure having an oval cross-section.

If the fuselage structure is considered with respect to the section 8, said structure comprises at the forward end of the aircraft a succession of ring frames of bilobed shape having ends 8a and, at the tail end, a succession of ring frames of oval shape having ends 8b. The dimensions of these oval frames in a horizontal transverse direction are reduced with respect to those of the bilobed frames.

Figure 12:
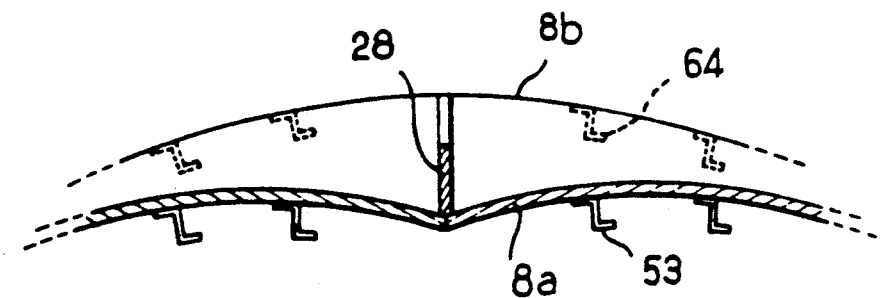
FIG. 12 is a transverse cross-section along line XII—XII of FIG. 11 in the region of the top line of junction of the shell.
Figures 13, 14:
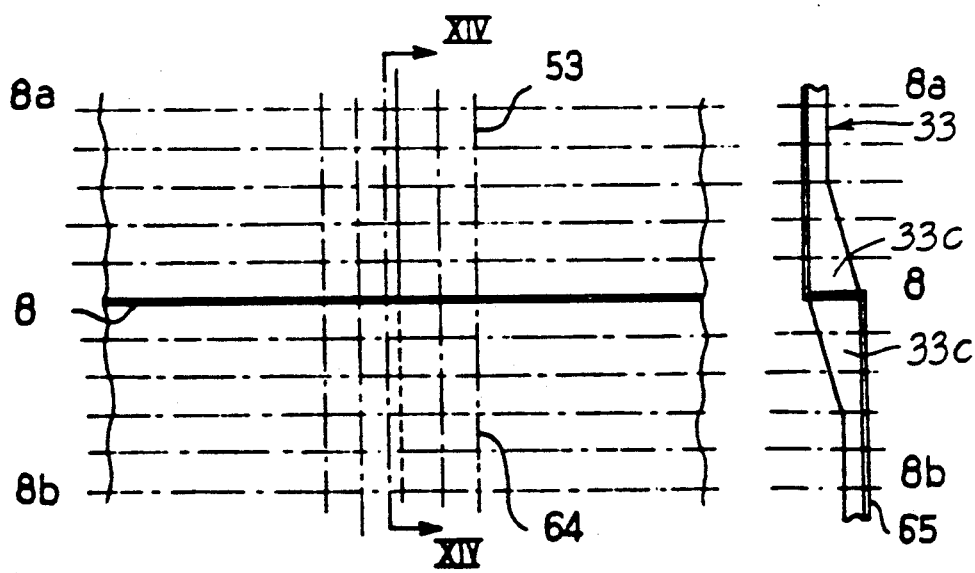
FIG. 13 is a schematic top view to a smaller scale showing the zone of transition of FIG. 11.
FIG. 14 is a cross-section along line XIV—XIV of FIG. 13.

At the level of the connection 8 of the ring frames of both types, a small dimensional discontinuity is formed as shown in FIG. 14, in which the double line 65 represents the limit of pressurization within the fuselage. The small portion of double line located at the level of 8 in FIG. 14 virtually corresponds to a small portion of pressurization bulkhead 74a which is visible in FIG. 11 and is braced by enlarged portions 33a of the ribbed beam 33. In FIG. 12 are also shown stringers 64 which are close to the longeron 28 and located in the line of extension of the stringers 53.

FIGS. 15 to 18C show how it is possible to construct a dome-shaped pressurization bulkhead 67 which is intended to be mounted within a fuselage in accordance with the invention, for example at the tail end, in order to constitute the bulkhead 15 of FIG. 1.

The domical bulkhead 67 is constituted by an overlapping assembly of several panels 68 such as the panels 68a, 68b, . . . 68k. The panels 68 are attached to each other by means of a curved longitudinal member 72 (FIG. 18A) and to curved stiffeners 73 (FIG. 18).

The bulkhead 67 is attached to a reinforcement (FIG. 15) composed of a peripheral frame 76 of oval shape and upright members 77.

This pressurization bulkhead structure has very high strength and can have any contour according to requirements in order to be adapted to the fuselage. It is thus possible to equip the forward bulkhead 14 and aft bulkhead 15 of FIG. 1.

In the fuselage according to the invention, arrangements are made to ensure that the central portion of the wing structure 9, which passes through the bilobed fuselage and forms a central wing box within the lower internal space of said fuselage, constitutes the limit of a cellular fuel tank 80 which will thus have an increased capacity. As shown in detail in FIG. 19, a structure of this type comprises a series of transverse lattice girders 81 applied on bracing struts 83 which are integrated in the structure of the central section 4 of the bilobed fuselage 1 and, more precisely, form part of the bilobed ring frames 8 defined earlier.

Through the cutaway portion of the top wall of the wing unit 9, there can also be seen the main beam 85 of the wing unit 9 which passes through the reservoir 80 in the central portion of this latter.

The top wall of the wing unit 9 supports spacer members 82 on which the cabin floor (not shown in FIG. 19) can be fixed.

By reason of the increased width of the inserted central portion of the wing unit 9, there is obtained a fuel tank of very large capacity which represents, according to the value of E, 1.5 to 1.9 times the volume of the corresponding tank of a monolobe aircraft having a diameter D. This considerably increases the radius of action of the bilobed-fuselage aircraft in accordance with the invention.

Furthermore, it is thus possible to increase the efficiency of movements of fuel between two tanks of the aircraft, these movements being intended to modify the position of the center of gravity of the aircraft during a flight with a view to reducing drag and achieving a saving of fuel.

One of the main advantages offered by a bilobed fuselage in accordance with the invention with respect to a known bilobed fuselage of the prior art having a central partition-wall is to permit considerably easier movement of passengers from one side of the aircraft to the other during flight as well as at the time of boarding the aircraft and debarkation. Moreover, this offers possibilities of evacuation under certain critical situations in which evacuation of the aircraft can take place only on one side.

According to another aspect of the invention, the considerations which now follow have been put to profitable use.

The possibility of moving transversely within a bilobed fuselage provided with connecting posts 31 in the longitudinal mid-plane depends primarily on the following parameters:

density of the posts or in other words pitch J of the posts, measured for example with respect to the pitch of the bilobed ring frames which form part of the transverse structure of the fuselage;

pitch P of the rows of seats, this pitch being primarily dependent on the category of seats (economy class, business class, first class), the pitch P being different from the pitch J as a general rule.

It is readily apparent that the diameter of the posts also has to be taken into account but is subject to only slight variation and can be considered as a constant. A diameter of the order of 5 centimeters can be indicated as an order of magnitude.

The ease with which passengers can move in the transverse direction within the bilobed fuselage may be appreciated by defining a fraction L representing the mean obstruction percentage, that is to say the mean percentage of transverse passageway lost with respect to the passageway which would be available if the posts did not exist. L is a linear function of the pitch J of the posts and of the pitch P of the rows of seats.

Figure 20:
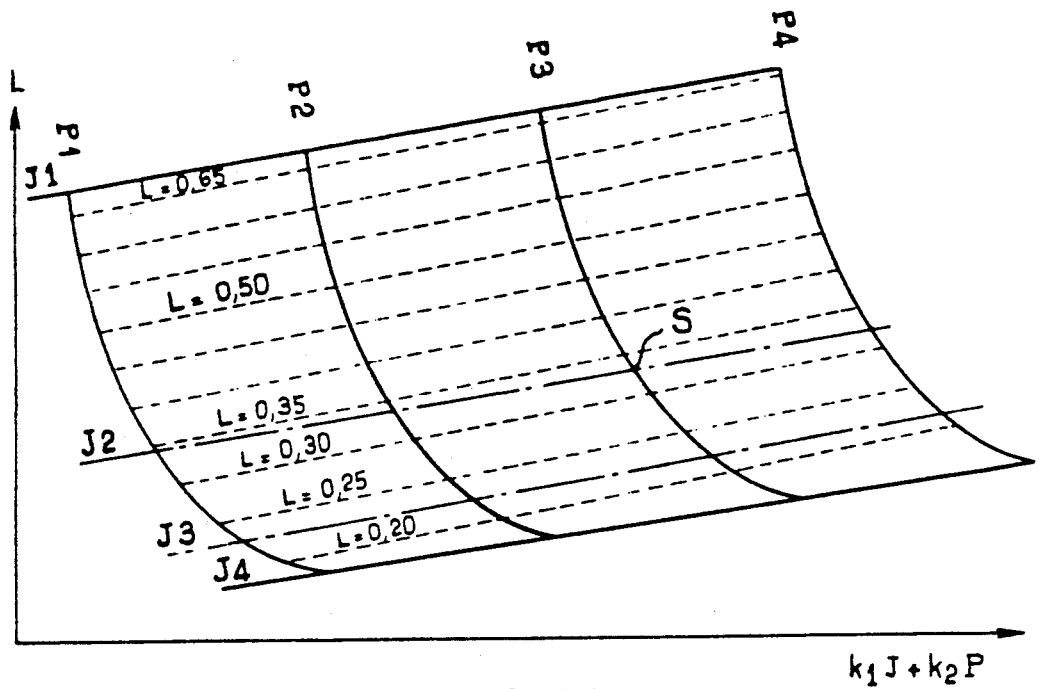
FIG. 20 is a diagram relating to the possibility of passenger movement from one side of the fuselage to the other between two consecutive rows of seats.

The diagram of FIG. 20 has been plotted in a system of coordinates in which the values of $k_1 J + k_2 J$ are shown in abscissae and the values of L are shown in ordinates ($k_1$ and $k_2$ are numerical constants).

The diagram comprises several families of curves:

parallel dashed straight lines corresponding to constant values of the mean obstruction coefficient L, ranging from L=0.20 to L=0.65;

parallel straight lines J1, J2, J3, J4 which are slightly inclined with respect to the preceding and correspond to constant values of the pitch J of the posts, with:

$J1 = 1 \times$ pitch of bilobed ring frames $J2 = 2 \times J1$ $J3 = 3 \times J1$ $J4 = 4 \times J1;$ curves P1, P2, P3, P4 corresponding to constant values of the pitch P of the rows of seats, with:

P1 = 28 ins., or 71 cms
P2 = 32 ins., or 81 cms (pitch of economy class)
P3 = 36 ins., or 91 cms (pitch of business class)
P4 = 40 ins., or 101 cms (pitch of first class).

This diagram shows that:

the mean obstruction percentage depends fairly little on the categories of seats (P1 to P4) since the straight lines L and J are nearly parallel;

as soon as the pitch J of the posts attains twice the pitch of the bilobed ring frames (straight line J2), the obstruction coefficient is then only $\frac{1}{3}$, or in other words that $\frac{2}{3}$ of the maximum space for transverse passenger movement remain free.

The invention is directed in particular to an arrangement of connecting posts and their position location with respect to the rows of seats, said posts being organized so as to ensure that, for transverse passenger movements, the loss of transverse passageway is less than one-half of the transverse passageway which would be available if the posts did not exist.

In FIG. 20, this would correspond to the zone of the diagram located beneath the dashed straight line $L=0.50$.

However, the obstruction coefficients drawn from the diagram considered above give only an indication which is valid in the general case but does not apply to certain specific combinations.

For example, if we have:

pitch of the rows of seats, $P=101$ cms (which corresponds to curve P4);

pitch of the bilobed ring frames $=50.5$ cms;

pitch of the posts, $J=2 \times$ pitch of the ring frames (which corresponds to the straight line J2);

The result is: $J=101$ cms$=P$.

In other words, if one adopts a suitable starting point, that is to say in transverse alignment with the seatbacks, the posts can be placed in such a manner as to ensure that there is never any obstruction.

But an exceptional situation of this kind is not wholly applicable within an aircraft which has several categories of seats and consequently several distinct pitches for the rows of seats.

Thus, if the aircraft is also equipped with a category of seats having a pitch P3, the pitch of the posts J2 being equal to that of the seats P4 will necessarily be different from that of the seats P3, assuming that the pitch of the ring frames is constant in the first place. In this case, the intersection S of J2 and of P3 provides the obstruction coefficient of P3 which is within the range of 0.30 to 0.35 as can be seen from the graph of FIG. 20.

By way of example, in the arrangement of FIG. 24, the posts 31a, 31b, 31c, 31d do not cause any obstruction whereas the post 31e does cause an obstruction.

In any case, the obstruction coefficient of the fuselage in accordance with the invention is distinctly lower than the obstruction coefficients of known bilobed fuselages, especially those of the fuselages of the two patents cited earlier:

U.S. Pat. No. 3,405,893 (Flamand), U.S. Pat. No. 4,674,712 (Whitener) in which, if reference is made to FIGS. 1 and 9 of the patent to Flamand or to FIG. 5 of the patent to Whitener, it is apparent that the obstruction coefficient is approximately 0.80.

The two fuselages just mentioned have another unfavorable characteristic, namely that the space available for transverse passenger movement is concentrated at two or three locations whereas, in the fuselage of the invention, the available space is distributed along the entire longitudinal mid-plane.

This last-mentioned arrangement is highly advantageous, not only for the comfort of passengers but also and above all in certain critical situations of evacuation on only one side of the aircraft. In such situations, any limitation in the number of zones of passage is liable to result in movements of panic which may in turn increase the time required for evacuation.

It may be added that current airworthiness regulations in regard to emergency evacuation of passengers, notably in the United States and in Europe, require in particular:

that aircraft must offer the possibility of discharging all the passengers through the doors located on one of the two sides of the aircraft, despite the fact that doors have to be installed on both sides;

that all the passengers must be placed, with respect to the exit doors, under conditions of proximity which are suited to the emergency situations.

It may be considered in regard to airworthiness certification that the requirements mentioned above are fully met by a bilobed-fuselage aircraft in accordance with the invention but that they are not fulfilled by the prior-art aircraft mentioned in the foregoing and that their certification could therefore not be obtained.

The bilobed fuselage in accordance with the invention offers various possibilities of seating arrangement comprising, as shown in FIGS. 21 to 24, in the case of each transverse row, five groups of seats separated by four longitudinal aisles N1, N2, N3, N4.

Three zones of seats (see FIG. 24) designated by the references 91, 92, 93 correspond respectively to the first class, to the business class and to the economy class.

The transverse arrangement provided for the first class zone is shown in FIG. 21. Ten seats 86 are placed abreast and distributed in five groups of two seats designated from left to right by the letters a, b, c, d, e respectively. In the central zone, the two seats 86c which are symmetrical with respect to the median plane are slightly spaced apart in order that a connecting post 31 may be passed between them if necessary.

Within each lobe, the central portion comprises one pair of seats, 86b–86b or 86d–86d.

FIG. 22 shows the arrangement of the business class zone. Twelve seats 87 are placed abreast and distributed in five groups also designated by the letters a, b, c, d, e. In contrast to the first class, the central group has four seats 87c arranged in two pairs which are slightly separated in order to allow for the post 31.

FIG. 23 shows the arrangement of the economy class. Fourteen seats 88 are placed abreast and distributed in five groups a, b, c, d, e. In contrast to the business class, the central group 88b, 88d of each lobe comprises three juxtaposed seats 88b or 88d instead of two juxtaposed seats 87b or 87d. The central region 88c always has four seats.

Figure 25:
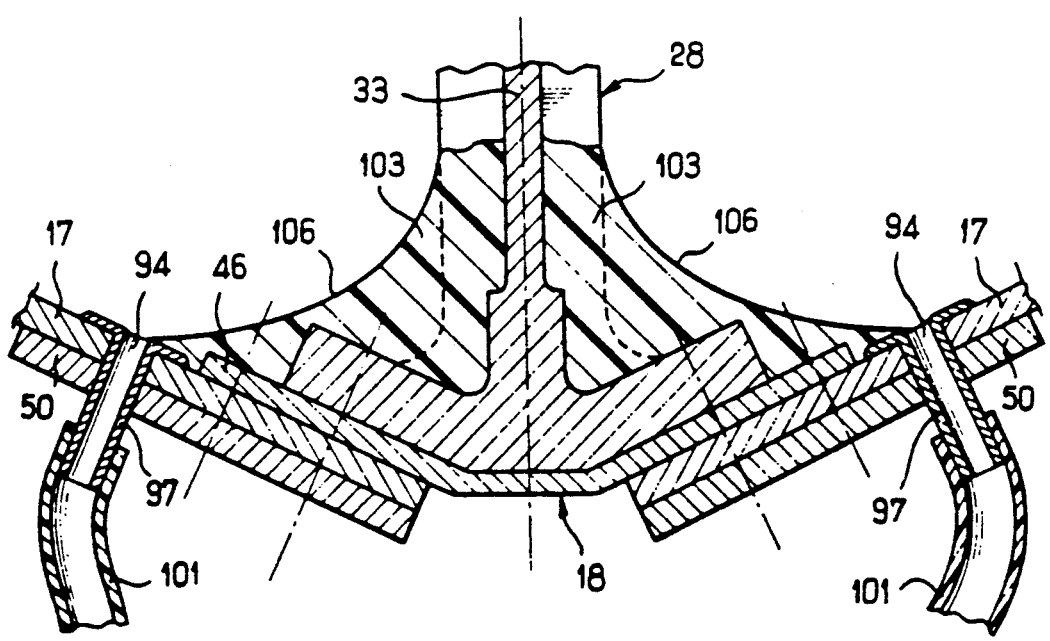
FIG. 25 is a transverse sectional view to a larger scale showing the top longeron of FIG. 5 and one embodiment of the water drainage system in the zone of junction of the two lobes.

In FIG. 25, there is shown one mode of construction of the top longeron 28 (see FIGS. 5 and 6) comprising a device for drainage of the water which is liable to collect beneath the fairing 21 within a bottom portion of the top region of the shell, in the vicinity of the line of junction 18 of the two lobes.

The need for this drainage also arises from the fact that the space located between the fairing 21 and the shell 17 is not pressurized. Although it does not communicate directly with the exterior, infiltrations or condensation may take place within this space.

Two orifices 94 are formed on each side of the longeron 28 through a portion of the fuselage shell 17 which is close to the median plane and the reinforcing gusset 50. Nipples 97 are mounted in leak-tight manner within the orifices 94 and are forcibly fitted within discharge pipes 101.

The device is completed by filling and sealing material 103 which is placed on each side of the web 33, said material being given profiles 106 which are adapted to produce good evacuation of water and in particular to ensure that the orifices 94 are located at the bottom points. The pipes 101 are connected to a discharge pump (not shown in the figure).

Figure 26:
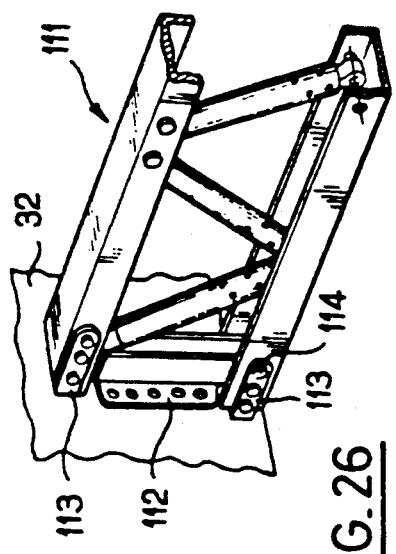
FIG. 26 is a schematic fragmentary plan view of the bilobed body of the aircraft of FIG. 1, showing the principal structures which serve to carry the load transported by the aircraft.

FIG. 26 is a diagram showing how the load carried by the aircraft is transmitted to the wing 9.

Figure 28:
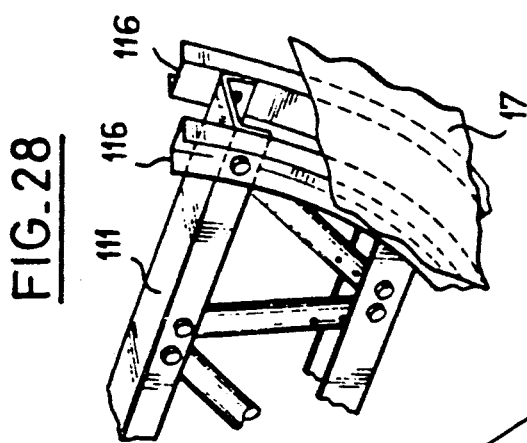
FIG. 28 is a view in perspective of a cross-beam for supporting the cabin floor.

The central longitudinal girder 32 carries the load of the cabin floor 23 (weight of passengers, of seats, of galleys, and so on) and of the lower floor 26 (weight of freight, of baggage, and so on). The girder 32 is in turn supported by cross-beams 111 (see FIG. 28) which transfer the load to the fuselage shell 17 and from this latter to the wings by means of the bracing struts 83 (see FIG. 19).

Figure 27:
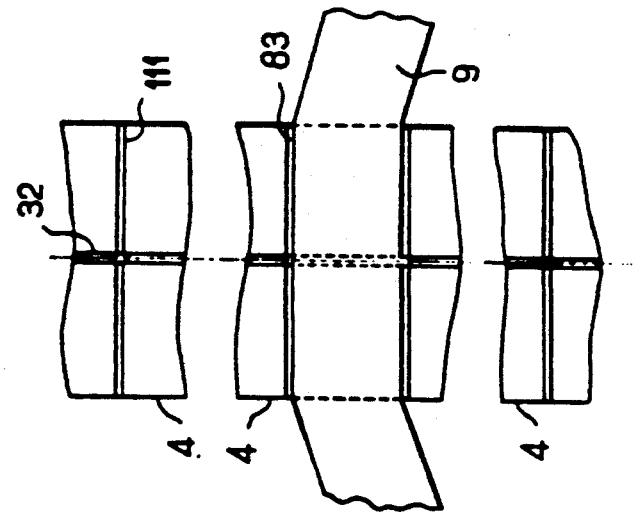
FIG. 27 is a schematic fragmentary plan view which is similar to FIG. 26 and shows the location of the access doors for freight.

The ease with which it is possible to load and unload the double hold 25 is clearly demonstrated in FIG. 27 which shows diagrammatically displacement of a container 108 within the hold of the aircraft. The container is introduced in the first portion of the hold through the opening 20 after opening the lateral door 20a of the aircraft. Said container can then be displaced in the forward direction (arrow K1) or towards the rear (arrow K2) in this first portion of the hold. It can readily be passed into the second portion of the hold through the opening 34 (arrow K3) since, at the level of this opening, the hold floor 26 is a continuous floor (as shown in FIG. 7A).

The cross-beam 111 is a lattice beam which is attached to the girder 32 by means of intermediate members 112, 113 and bolts 114. In the vicinity of the external wall, the beam 111 is bolted to reinforcing ring frames 116 which are in turn attached to the shell 17 by means of bolts.

It is thus apparent that the bilobed double-shell fuselage in accordance with the invention can be constructed in an economical and reliable manner by making the best possible use of pre-existing monolobe shell structures.

Furthermore, a bilobed fuselage of this type offers many outstanding advantages both at the time of manufacture and during use.

Thus the large hold volume provided by the bilobed fuselage in accordance with the invention permits the partial use of this latter for functions other than freight transport. For example, provision can be made for the installation of toilets, galleys or kitchens and even cabins, lounges or bars. Access to these specialized spaces from the cabin floor can be provided by one or more interior stairways or even by one or a number of elevators.

As will be readily apparent, the invention is not limited to the examples of construction which have just been described and a large number of modifications may accordingly be contemplated without thereby departing from the scope or the spirit of the invention.

What is claimed is:

1. An aircraft fuselage having a forward end section, a rear end section, and a central section that constitutes a major part of the length of the fuselage, the central section being formed by first and second elongated lobes placed side by side such that the lobes intersect along a top longitudinal junction line and a bottom longitudinal junction line to form a bilobed fuselage shell, wherein the fuselage comprises:
   a top stiffening longeron extending along the top junction line of the two lobes, the top stiffening longeron being located above the top junction line;
   a bottom stiffening longeron extending along the bottom junction line of the two lobes;
   a first floor dividing the central section into an upper internal space adapted to serve as a passenger cabin and a lower internal space adapted to serve as a freight and baggage hold;
   means for supporting the first floor and for connecting the first floor to a lower portion of the fuselage;
   a plurality of longitudinally-spaced transverse rows of seats arranged in the upper internal space; and
   a plurality of longitudinally-spaced upright connecting means disposed at intervals in the rows of seats for connecting the top longeron to structural members located in the lower internal space.

2. An aircraft fuselage having a forward end section, a rear end section, and a central section, the central section constituting a major part of the length of the fuselage and being formed by first and second elongated lobes placed side by side such that the lobes intersect along a top longitudinal junction line and a bottom longitudinal junction line to form a bilobed fuselage shell, wherein the fuselage comprises:
   a top stiffening longeron extending along the top junction line of the two lobes;
   a bottom stiffening longeron extending along the bottom junction line of the two lobes, the bottom stiffening longeron being located below the bottom junction line;
   a first floor dividing the central section into an upper internal space adapted to serve as a passenger cabin and a lower internal space adapted to serve as a freight and baggage hold;
   means for supporting the first floor and for connecting the first floor to a lower portion of the fuselage;
   a plurality of longitudinally-spaced transverse rows of seats arranged in the upper internal space; and
   a plurality of longitudinally-spaced upright connecting means disposed at intervals in the rows of seats for connecting the top longeron to structural members located in the lower internal space.

3. An aircraft fuselage having a forward end section, a rear end section, and a central section, the central section constituting a major part of the length of the fuselage and being formed by first and second elongated lobes placed side by side such that the lobes intersect along a top longitudinal junction line and a bottom longitudinal junction line to form a bilobed fuselage shell, wherein the fuselage comprises:
   a top stiffening longeron extending along the top junction line of the two lobes, the top stiffening longeron being located above the top junction line;
   a bottom stiffening longeron extending along the bottom junction line of the two lobes, the bottom stiffening longeron being located below the bottom junction line;
   a first floor dividing the central section into an upper internal space adapted to serve as a passenger cabin and a lower multiple-purpose internal space adapted to serve as a freight hold;
   means for supporting the first floor and for connecting the first floor to a lower portion of the fuselage;
   a plurality of longitudinally-spaced transverse rows of seats arranged in the upper internal space; and a plurality of longitudinally-spaced upright connecting means disposed at intervals in the rows of seats for connecting the top longeron to structural members located in the lower internal space.

4. An aircraft fuselage having a forward end section, a rear end section, and a central section that constitutes a major part of the length of the fuselage, the central section being formed by first and second elongated lobes placed side by side such that the lobes intersect along a top longitudinal junction line and a bottom longitudinal junction line to form a bilobed fuselage shell, wherein the fuselage comprises:

a top stiffening longeron extending along the top junction line of the two lobes;

a bottom stiffening longeron extending along the bottom junction line of the two lobes;

a first floor dividing the central section into an upper internal space adapted to serve as a passenger cabin and a lower internal space adapted to serve as a freight and baggage hold;

means for supporting the first floor and for connecting the first floor to a lower portion of the fuselage;

a plurality of longitudinally-spaced transverse rows of seats arranged in the upper internal space; and a plurality of longitudinally-spaced upright post means disposed in a plane containing the top and bottom junction lines, each post means having an upper end and a lower end connected respectively to the top longeron means and to the means for supporting the first floor, the dimension of each post means in the longitudinal direction of the fuselage being less than the minimum longitudinal dimension of a seat, and adjacent post means having a pitch that is at least equal to the minimum pitch of the rows of seats.

5. A fuselage according to claim 4 wherein the pitch of the post means is determined with respect to the spacing of the rows of seats so as to ensure that each one of a majority of said post means is located between adjacent seats in a row to ensure maximum freedom of lateral passenger movement between the rows of seats.

6. An aircraft fuselage having a forward end section, a rear end section, and a middle section that constitutes a major part of the length of the fuselage, the middle section including first and second elongated lobe shells placed side by side such that the lobes intersect along a top longitudinal junction line and a bottom longitudinal junction line to form a bilobed fuselage shell, central structural means connecting the top and bottom junction lines of the fuselage shell to enable the bilobed fuselage to withstand operational stresses and internal pressurization, and a floor dividing the middle section into an upper internal space adapted to serve as a passenger cabin and a lower internal space adapted to serve as a freight and baggage hold, wherein the central structural means comprises:

a top longeron means attached to the first and second lobe shells along the top junction line for stiffening the bilobed fuselage shell at said top junction line;

a bottom longeron means attached to the first and second lobe shells along the bottom junction line for stiffening the bilobed fuselage at said bottom junction line;

longitudinal girder means having an upper portion that is rigidly attached to the floor and a lower portion that is rigidly connected to the bottom longeron means for supporting the floor and for connecting the floor to a lower portion of the fuselage shell;

a plurality of longitudinally-spaced transverse rows of seats arranged in the upper internal space;

a plurality of longitudinally-spaced upright post means disposed in a plane containing the top and bottom junction lines, each post means having an upper end and a lower end;

first hinge means connecting the upper end of each post means to the top longeron with a hinge axis that is transverse to said plane; and second hinge means connecting the lower end of each post means to the upper portion of the longitudinal girder means with a hinge axis that is transverse to said plane, there being no structural connections intermediate adjacent post means between the top longeron means and the upper portion of the longitudinal girder means.

7. A fuselage according to claim 6 wherein the longitudinal girder means comprises a girder extending longitudinally in a transversely central portion of the floor, said girder being in turn attached to the bottom longeron means in the vicinity of the bottom junction line of the first and second lobes.

8. A fuselage according to claim 7 and further comprising an additional floor in the lower internal space below the first-mentioned floor and adapted to support freight and baggage, wherein the girder carries the load of both the first-mentioned floor and the additional floor, and the fuselage further comprises a plurality of cross beams, for transferring said load to the fuselage shell, and bracing struts to transfer the load from the fuselage shell to wings of the aircraft.

9. A fuselage according to claim 6 wherein the plane containing the top and bottom junction lines is transversely spaced from a longitudinal axis of each lobe by a distance (d) which is shorter than the radius of the cross section of said lobe by a value which is slightly greater than the transverse overall size of a seat.

10. A fuselage according o claim 6 wherein at least one of the top and bottom junction lines coincides with a stringer which forms part of the peripheral structure of a lobe shell.

11. A fuselage according to claim 6 wherein the fuselage shell comprises longitudinally spaced ring frames, and the pitch of the posts which connect the top longeron means to the upper portion of the longitudinal girder means is a multiple between 1 and 4 of the pitch of the ring frames forming the fuselage.

12. A fuselage according to claim 6 wherein the middle section further comprises a wing unit that passes through the lower internal space, said wing unit including a central wing box located within said lower internal space and serving as an outer boundary of a high-capacity cellular tank for aircraft fuel.

13. A fuselage according to claim 6 wherein the width of a transverse cross section of the bilobed body is substantially within the range of 1.5 to 1.8 D, where D designates the diameter of each lobe.

14. A fuselage according to claim 6 wherein the rows of seats are placed in the majority of cases in alignment with the connecting post means so as to permit free lateral passenger movement between two rows of seats from one side of the fuselage to the other.

15. A fuselage according to claim 6 wherein the arrangement of the connecting post means and their position locations with respect to the rows of seats correspond in the case of transverse passenger movement from one lobe into the other to a loss of less than one-half the transverse passageway which would be available if the posts did not exist.

16. A fuselage according to claim 6 wherein the arrangement of at least one of the rows of seats comprises, in a zone located near the longitudinal median plane containing the top and bottom junction lines, two adjacent seats disposed symmetrically with respect to said plane and transversely spaced at a distance corresponding to the transverse dimension of a connecting post means.

17. A fuselage according to claim 6 wherein the arrangement of the rows of seats comprises each row of seats extending from one side of the bilobed body to the other, with five groups of seats per row, each group being composed of two to four seats, and each two adjacent groups of seats in the row being separated by a longitudinal aisle.

18. A fuselage according to claim 6 wherein the first lobe is provided with outer doors for access to the upper internal space and the second lobe is provided with at least one outer hatch for access to the lower internal space.

19. A fuselage according to claim 18 and further comprising an additional floor in the lower internal space below the first-mentioned floor and adapted to support freight and baggage, wherein said additional floor comprises a first platform in the first lobe, a second platform in the second lobe, and a portion of the bottom longeron means that at least partially separates the first and second platforms, the first and second platforms and the portion of the bottom longeron means lying in approximately the same plane.

20. A fuselage according to claim 18 wherein the longitudinal girder means is provided with at least one opening large enough to permit lateral transfer of a standard sized air transport container between the first and second lobes.

21. A fuselage according to claim 20 wherein the bottom longeron means comprises a dropped portion at the location of said at least one opening, the dropped portion being provided with a substantially flat top bearing surface to permit transferring containers between the first and second lobes.

22. A fuselage according to claim 21 wherein the bottom longeron means further comprises transition elements connecting the dropped portion to the remainder of the bottom longeron means on each side of said opening to ensure continuity in the distribution of loads on the bottom longeron means.

23. A fuselage according to claim 6 wherein the interior of the bilobed fuselage shell is pressurized, the fuselage further comprising a top fairing that covers the top junction line and extends laterally to blend with the bilobed fuselage shell to define an unpressurized space between the top fairing and the bilobed fuselage shell.

24. A fuselage according to claim 6 wherein the interior of the bilobed fuselage shell is pressurized, the fuselage further comprising a bottom fairing that covers the bottom junction line and extends laterally to blend with the bilobed fuselage shell to define an unpressurized space between the bottom fairing and the bilobed fuselage shell.

25. A fuselage according to claim 6 and further comprising an additional floor arranged below said first mentioned floor in the lower internal space of the fuselage, said additional floor adapted to support freight and baggage.

26. An aircraft fuselage having a forward end section, a rear end section, and a middle section that constitutes a major part of the length of the fuselage, the middle section being formed by first and second elongated lobes placed side by side such that the lobes intersect along a top longitudinal junction line and a bottom longitudinal junction line to form a bilobed fuselage shell, wherein the fuselage comprises:
 a top stiffening longeron extending along the top junction line of the two lobes;
 a bottom stiffening longeron extending along the bottom junction line of the two lobes;
 a floor dividing the middle section into an upper internal space adapted to serve as a passenger cabin and a lower internal space adapted to serve as a freight and baggage hold;
 means for supporting the floor, said supporting means being carried by the bottom longeron;
 a plurality of longitudinally-spaced transverse rows of seats arranged in the upper internal space;
 a plurality of longitudinally-spaced upright posts disposed at intervals in the rows of seats, each post having an upper end linked to the top longeron and a lower end linked to the means for supporting the floor such that upper and lower ends of the post can pivot about axes perpendicular to a plane containing the top and bottom junction lines, whereby the posts are loaded only axially by forces acting on the top longeron and on the means for supporting the floor; and
 cross beams connecting the means for supporting the floor to the fuselage shell.

27. A large capacity aircraft comprising a fuselage according to claim 1 or 2 or 3 or 4 or 6 or 26.

* * * * *